United States Patent
Selekman et al.

(10) Patent No.: US 11,381,533 B1
(45) Date of Patent: *Jul. 5, 2022

(54) INTELLIGENT DETERMINATION OF WHETHER TO INITIATE A COMMUNICATION SESSION FOR A USER BASED ON PROXIMITY TO CLIENT DEVICE

(71) Applicant: Meta Platforms, Inc., Menlo Park, CA (US)

(72) Inventors: Aryeh Selekman, Washington, DC (US); Girish Patangay, Los Altos, CA (US); Viresh Rustagi, Palo Alto, CA (US); Dev Bala, Redwood City, CA (US); Nikhil Gautam, Santa Clara, CA (US); Rafael Camargo, Monte Sereno, CA (US); Michael Jon Sundermeyer, Palo Alto, CA (US); Magdalena Krystyna Hammer, Pleasanton, CA (US)

(73) Assignee: Meta Platforms, Inc., Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/909,808

(22) Filed: Jun. 23, 2020

Related U.S. Application Data

(63) Continuation of application No. 16/153,596, filed on Oct. 5, 2018, now Pat. No. 10,735,355.

(51) Int. Cl.
*G06F 15/16* (2006.01)
*H04L 51/043* (2022.01)
*G06F 16/9535* (2019.01)
*H04W 4/02* (2018.01)
*G06F 16/901* (2019.01)
*H04L 51/52* (2022.01)
*H04W 76/14* (2018.01)
*H04L 51/00* (2022.01)
(Continued)

(52) U.S. Cl.
CPC ........ *H04L 51/043* (2013.01); *G06F 16/9024* (2019.01); *G06F 16/9535* (2019.01); *G06V 40/172* (2022.01); *H04L 51/12* (2013.01); *H04L 51/32* (2013.01); *H04W 4/025* (2013.01); *H04W 76/14* (2018.02); *G06Q 50/01* (2013.01)

(58) Field of Classification Search
CPC .............................. H04L 51/043; H04W 4/025
USPC ........................................................ 709/204
See application file for complete search history.

(56) References Cited

U.S. PATENT DOCUMENTS

| | | | |
|---|---|---|---|
| 8,868,650 B1 * | 10/2014 | Reeves | H04N 7/15 348/14.01 |
| 10,057,700 B2 * | 8/2018 | Proctor, Jr. | H04N 21/439 |

(Continued)

*Primary Examiner* — Hee Soo Kim
(74) *Attorney, Agent, or Firm* — Fenwick & West LLP

(57) ABSTRACT

A client device receives a request to initiate a communication session with a particular user of a first plurality of users that are registered with the client device. The client device determines, using a sensor of the client device, a respective identity of each of a second plurality of users that are proximate to the client device. The client device determines whether an identity of the particular user matches the respective identity of any of the second plurality of users, and, in response to determining that the identity of the particular user matches the respective identity of any of the second plurality of users, the client device transmits the request to a device of the particular user.

20 Claims, 5 Drawing Sheets

(51) Int. Cl.
 *G06V 40/16* (2022.01)
 *G06Q 50/00* (2012.01)

(56) References Cited

U.S. PATENT DOCUMENTS

| | | | | |
|---|---|---|---|---|
| 10,412,206 | B1* | 9/2019 | Liang | H04M 3/42204 |
| 2014/0179230 | A1* | 6/2014 | Sydir | H04W 4/029 |
| | | | | 455/41.2 |
| 2015/0195100 | A1* | 7/2015 | Imes | H04W 4/33 |
| | | | | 455/420 |
| 2016/0132031 | A1* | 5/2016 | Kozu | H04L 12/2816 |
| | | | | 700/275 |
| 2017/0026974 | A1* | 1/2017 | Dey | H04M 3/42263 |
| 2018/0206083 | A1* | 7/2018 | Kumar | H04L 67/22 |

* cited by examiner

500

Receive, at a client device, a request to initiate a communication session with a particular user of a first plurality of users that are registered with the client device
505

Determine, using a sensor of the client device, a respective identity of each of a second plurality of users that are proximate to the client device
510

Does an identity of the particular user match the respective identity of any of the second plurality of users?
515

Y

Transmit the request to a device of the particular user
520

FIG. 5

INTELLIGENT DETERMINATION OF WHETHER TO INITIATE A COMMUNICATION SESSION FOR A USER BASED ON PROXIMITY TO CLIENT DEVICE

CROSS REFERENCE TO RELATED APPLICATION

This application is a continuation of U.S. patent application Ser. No. 16/153,596, filed Oct. 5, 2018, which is hereby incorporated by reference in its entirety.

BACKGROUND

This disclosure relates generally to establishing a communication session, and more specifically to intelligently determining to forward, or refrain from forwarding, a request to establish a communication session based on a present location of the intended recipient of the session and a present location of additional parties.

Increasingly, more and more types of client devices that are capable of establishing a communication session are being placed in users' homes. For example, smart televisions, home security devices, and the like are now able, among performing other functions, to establish telephone and video calls. In a specific example, a video call intended for a particular user may be routed to a television screen that the particular user is currently facing.

However, while greater convenience has become available to users as users can establish communication sessions on more and more devices, conventional client devices do not account for the possibility that a user would, in some circumstances, prefer to not establish a communication session. For example, while a user may typically enjoy having a video call from his wife launched using his smart television, the user would likely not want that same call launched, or even alerted, using his smart television when he has friends sitting in front of the television with him. Instead, the user may prefer to not receive the call at all, or to only be alerted to the call privately (e.g., using his smart phone). Unless such contextual considerations (e.g., privacy) are accounted for when communication sessions are being initiated with client devices, the ability for those client devices to initiate communication sessions is likely to become more of a nuisance than a convenience for users.

SUMMARY

Various client devices, such as communication devices in a user's home, receive requests to initiate communication sessions (e.g., a video calls), and determine whether to alert a user to such a request based on settings associated with the devices and settings associated with the user. As an example, a communications device in a user's home may receive a video call request for a particular user, and may have different settings for alerting the user to the video call. The settings may indicate that calls received when the user is home should always ring on a given appliance in the user's home (e.g., a smart television), or should never ring on the given appliance (but should, e.g., instead ring on the user's mobile device). The settings may alternatively, or additionally, indicate that the same, or a different, given appliance should sometimes ring, based on various parameters. The parameters may dictate a determination as to whether the particular user is near the communications device and the given appliance, and may also dictate a determination as to whether other users are near the communications device, the given appliance, or the particular user. Using these settings, the communications device may intelligently determine whether to transmit communication session requests to a given appliance.

In some aspects of the disclosure, a client device receives a request to initiate a communication session with a particular user of a first plurality of users that are registered with the client device. For example, the client device may be an Internet-enabled smart hub that, among other things, can transmit and receive communication session requests. The request may be a video call request from a source user that is addressed to the particular user, and that was routed to the client device because the particular user is registered with the client device as a member of the home for which the client device is a hub.

The client device uses a sensor to determine a respective identity of each of a second plurality of users that are proximate to the client device (e.g., in response to receiving the request). As described below, this identity detection may be disabled based on user authorization settings. The sensor may be a camera sensor, a signal strength sensor, or another sensor of the client device (or some combination thereof). Where the sensor is a camera sensor, the client device activates the camera sensor and detects an image of a face using the camera sensor. In response to detecting the image, client device determines whether the face matches characteristics of the particular user, and in response to determining that the face matches the characteristics of the user, the client device determines the identity of the particular user. The image may include an additional face (or several additional faces).

The client device maintains and enforces one or more privacy settings for users and other people captured in the video data or other data in various embodiments. For example, the client device may have a default privacy setting preventing the controller from identifying a user until the user manually alters the privacy setting to allow the controller to identify the user. The default privacy setting may also extend to any captured video data, audio data, image data, or other data so that a user may select whether to allow the image capture device to identify any user in the data. Additionally, the privacy setting also regulates transmission of information from the client device to another entity (e.g., another client device or a third party system). The various privacy settings allow a user to control the identification of the user and the storage and sharing of any user-related data. The privacy settings also may be enforced individually with respect to each individual. For example, a user opting in a user identification feature may not change the default privacy settings for other users that may be incidentally captured in the local area surrounding the client device.

In embodiments where the image includes an additional face, or several additional faces, the client device may determine, based on the additional face, that an additional user is proximate to the device of the particular user. In response to determining that the additional user of the second plurality of users is proximate to the device of the particular user, the client device may determine whether the additional user is in the first plurality of users (e.g., thus indicating that the additional user is also registered to the client device). In response to determining that the additional user is not in the first plurality of users (e.g., because the additional user is not registered to the client device), the client device transmits the request to the device of the particular user in a manner that is not perceptible to the additional user. Moreover, further in response to determining that the additional user is proximate to the device of the particular user, the client device, upon the authorization of the user and/or subject to the user's privacy setting, may access a social graph and determine whether the social graph includes an edge connecting a first node representing the particular user and a second node representing the additional user. The client device may transmit the request to the device of the particular user in the manner that is not perceptible to the additional user when the social graph does not comprise the edge, and may transmit the request in a perceptible manner in response to determining that the social graph comprises the edge. Authorization settings associated with the additional user may disable this feature to prevent modifying the manner in which something is performed based on the presence of the additional user.

In embodiments where the sensor is a signal strength sensor, the client device may determine the respective identity of each of the second plurality of users that is proximate to the client device by determining, using the signal strength sensor, a signal strength of the device of the particular user and determining whether the signal strength exceeds a threshold signal strength. In response to determining that the signal strength exceeds the threshold signal strength, the client device determines that the particular user is proximate to the client device, and adds the particular user to the second plurality of users. However, where the client device determines that the signal strength does not exceed the threshold signal strength, the client device determines that the particular user is not proximate to the client device, and refrains from adding the particular user to the second plurality of users.

In some embodiments where the sensor of the client device is a signal strength sensor and subject to user's privacy settings, the client device may determine the respective identity of each of the second plurality of users that are proximate to the client device by detecting a device corresponding to an additional user, determining a signal strength of the device corresponding to the additional user, and determining whether the signal strength of the device corresponding to the additional user matches the signal strength of the device of the particular user. In response to determining that the signal strength of the device corresponding to the different user matches the signal strength of the device of the particular user, the client device may output the alert to the particular user in a manner that is not perceptible to the additional user.

Regardless of whether an additional user is detected by a camera sensor, a signal strength sensor, or otherwise, the client device determines whether an identity of the particular user matches the respective identity of any of the second plurality of users. In other words, the client device determines, using the sensor, whether the particular user to whom the communication session request is addressed is detectable, and thus proximate, to the client device. In response to determining that the identity of the particular user matches the respective identity of any of the second plurality of users, the client device transmits the request to a device of the particular user (which may in turn alert the user to the request, or seamlessly initiate, e.g., a video call as requested). In some embodiments, further in response to determining that the identity of the particular user matches the respective identity of any of the second plurality of users, the client device retrieves a setting corresponding to the particular user indicating that the particular user is not to be alerted to the request when a particular other user is proximate to the particular user. The client device then determines whether the particular other user is within the second plurality of users, and, in response to determining that the particular other user is within the second plurality of users, the client device refrains from transmitting the request to the device of the particular user.

In some embodiments, in response to receiving the request, the client device retrieves a profile of the particular user from a database (e.g., local storage or cloud storage) and determines whether the profile indicates that the request should always or never be alerted to the particular user. In response to determining that the profile indicates that the request should always be alerted to the particular user, the client device transmits the request to the device of the particular user regardless of whether the identity of the particular user matches the respective identity of any of the second plurality of users. However, in response to determining that the profile indicates that the request should never be alerted to the particular user, the client device refrains from transmitting the request to the device of the particular user regardless of whether the identity of the particular user matches the respective identity of any of the second plurality of users.

The client device may detect an acceptance of the communication session based on an interaction by the particular user with the request, and may detect, during the communication session, a presence of an additional user of the second plurality of users who is communicating within the communication session by way of the device of the particular user. In such embodiments, the client device detects that the additional user is no longer proximate to the device of the particular user, and determines whether to extend the communication session to a device of the additional user. In response to determining to extend the communication session to the device corresponding to the additional user, the client device causes a request to be transmitted to the device corresponding to the additional user to join the communication session. The additional user may prevent this activity from occurring by using authorization settings that prevent the client device from monitoring the additional user's activity to determine whether to cause the request to be transmitted to the additional user's device. When determining whether to extend the communication session to the device corresponding to the additional user, the client device may detect, while the additional user is proximate to the device of the particular user, input by the additional user that indicates an intent to remain part of the communication session, and may determine a length of time between the input by the additional user and a time at which the second user became no longer proximate to the secondary device. The client device may then determine whether the length of time is below a threshold length of time, and may responsively determine to extend the communication session to the device of the additional user.

BRIEF DESCRIPTION OF THE DRAWINGS

FIG. 5 is a flowchart of a method for determining whether to transmit a request for a communication session from a client device to a particular user, in accordance with an embodiment.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

System Architecture

Figure 1:
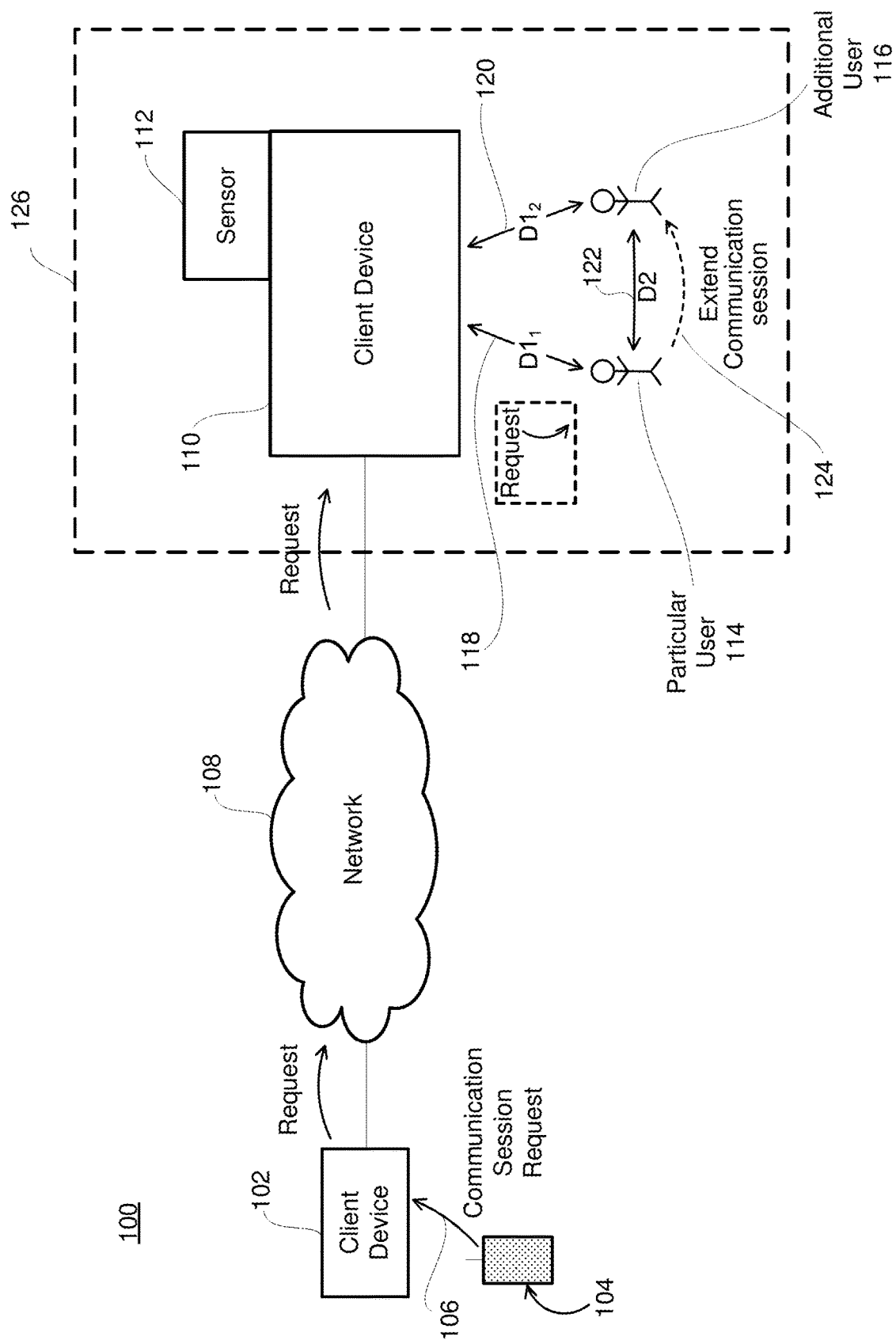
FIG. 1 is a block diagram of a system environment in which a communication session request is selectively transmitted to one or more users, in accordance with an embodiment.

FIG. 1 is a block diagram of a system environment in which a communication session request is selectively transmitted to one or more users, in accordance with an embodiment. As a general overview, system environment 100 includes client device 102, which receives request 106 to initiate a communication session from appliance 104, the communication session being addressed to particular user 114. Client device 110 receives the request from client device 102, the request having been transmitted across network 108. As will be described in further detail below, client device 110 uses sensor 112 to determine whether to transmit the request the request to particular user 114. As will also be described in further detail below, if the communication session is initiated, client device 110 may additionally use sensor 112 to determine whether to extend 124 the communication session to additional user 116.

Client device 102, client device 110, appliance 104, and appliances/devices that are not depicted but described as being used by, or in connection with, particular user 114 and additional user 116, all have at least the functionality described below of client device 210, described with respect to FIG. 2. Network 108 has at least the functionality described below of network 220 with respect to FIG. 2. Moreover, network 108 may connect any component described herein to any other component described herein (e.g., client device 102 may communicate with third party system 230 or online system 240), even if not expressly depicted in a given figure.

Following FIG. 1 in greater detail, client device 110 receives, from client device 102, over network 108, request 106 to initiate a communication session with particular user 114. In addition to other described possible embodiments of client device 110 (e.g., transmitting and receiving commands to/from devices over network 108), client device 110 (and similarly, client device 102) may be a hub device for a household that accepts commands from household devices and is configured to, if requested as part of the command, transmit those commands to other household devices. For example, if a household has various Internet-capable devices (interchangeably used with the term "appliance"), such as a smart television and a refrigerator with a screen, client device 102 is capable of receiving a command from appliance 104 and forwarding that command to either the smart television or the refrigerator, and vice versa (appliance 104 may receive commands by way of client device 102 from the smart television or refrigerator). Moreover, the communication session may be any form of communication, including continuous communication (e.g., video and/audio call sessions or chat sessions), or one-off communications, such as e-mail and text messaging.

Client device 102 and client device 110 may be aware of what devices are part of household 126 by using a register, where household devices are registered, either to local memory of client device 102 or client device 110, or to cloud memory (e.g., accessible through network 108). Moreover, client device 102 and client device 110 may register members of a household as well (e.g., characteristics, such as facial or fingerprint characteristics), and may thus be able to identify human beings or animals (e.g., pets) that are part of a household. The registers may be created through manual or automatic processes.

Following from the above, when client device 110 receives request 106, client device may determine that request 106 is addressed to particular user 114, and may determine that particular user 114 is a member of household 126, along with other members of household 126. Client device 110 uses sensor 112 to determine a respective identity of each user that is proximate to the client device 110. Sensor 112 may be any type of sensor, such as a visual sensor (e.g., a camera sensor), a signal strength sensor, or any other type of sensor that can identify proximate users (e.g., by identifying the user directly, or by identifying a device or item on or near the user's person). While sensor 112 is depicted as attached to client device 110, sensor 112 may be detached from client device 110, and may communicate with client device 110 through any form of local communications (e.g., Bluetooth, WiFi, etc.) or through network 108. Moreover, while only one sensor 112 is depicted, any number of sensors 112 may be used by client device 110, and any number of them may be attached or detached from client device 110.

The term "proximate" depends on the type of sensor 112 used by the client device, and may be defined to be within a line of sight, within a threshold distance, within household 126, or any other type of definition. The definition may be supplied by default, or may be adjustable or set by a user with administrative privileges for client device 110.

Where sensor 112 is a camera sensor, client device 110 activates the sensor 112 and detects images of faces (e.g., the faces of particular user 114 and additional user 116) using the camera sensor. In response to detecting the image, client device 110 compares the characteristics of the faces to known characteristics of users that are registered to client device 110, as described above. The known characteristics themselves may not be stored to the register, and instead may be stored at, and retrieved from, a third party service, such as a service that stores facial recognition data for known persons. Based on this comparison, client device 110 determines whether the any of the detected faces match the registered characteristics of particular user 114, and in response to determining that the face matches the characteristics of particular user 114, the client device may determine that particular user 114 is proximate to client device 110 and that request 106 should be transmitted to a device of particular user 114.

Where more than one person is present in household 126 and detectable by sensor 112 (e.g., additional user 116 may be in a line of sight of camera sensor 112), the client device may determine whether the other user or users (e.g., additional user 116) is also registered to the client device 110 (e.g., likely meaning that additional user 116 is a member of household 126, or is a trusted guest). If the other user(s) are not registered to client device 110, client device 110 may refrain from transmitting request 106 to a device of the particular user (e.g., an appliance 104) entirely (such settings are discussed in further detail below), or may transmit the request to the device of the particular user in a manner that is not perceptible to the other user(s). An example of transmitting the request in a manner that is not perceptible to the other user(s) include transmitting the request to a personal/smartphone device of particular user 114 (e.g., as opposed to a more public device of the user such as a smart television). Another example of transmitting the request in a manner that is not perceptible to the other user(s) may include causing an alert to appear on a private device of the user (e.g., the user's personal/smartphone device), where the user can elect on which device to receive the call, or to decline the call. Any manner of transmitting the request to the user in a manner that is not easily visible to the other user(s) may be used.

In some instances, particular user 114 may be comfortable with additional user 116 viewing or participating in the requested communication session notwithstanding that additional user 116 is not registered with client device 110, and thus is determined by client device 110 to not be part of household 126. For example, particular user 114 may be represented by a node on a social graph, and may have input a comfort level with people represented by particular other nodes on the social graph, by people that are connected to the node with an edge crossing no more than a specified number of intervening nodes (e.g., within one degree of separation), and the like. In such embodiments, client device 110 may transmit request 106 to a device (e.g. a public device) of particular user 114 notwithstanding that additional user 116 has been detected by sensor 112, so long as the parameters for the comfort level are met. Client device 110 may determine whether the parameters for the comfort level are met by accessing a service providing the social graph (e.g., third party system 230 or online system 240, as described in further detail below), and determining the relative distance between the node representing particular user 114 and additional user 116, and then determining whether that relative distance satisfies the input comfort level. This may be extended to any number of further additional users detected by sensor 112 that are not registered to client device 110. If the input comfort level is not met, then client device 110 transmits request 106 in a manner that is not perceptible to additional user 116.

As mentioned above, as an alternative to, or in addition to, sensor 112 being a camera sensor, sensor 112 may also be a signal strength sensor. In such embodiments, client device 110 may determine the respective identity of each of the detectable users (e.g., particular user 114 and additional user 116, as depicted in FIG. 1) in household 126 by determining, using sensor 112, a signal strength of a respective device of each user (e.g., an appliance 104 that is likely being carried by particular user 114) and determining whether the signal strength exceeds a threshold signal strength. Client device 110 may determine the threshold signal strength by retrieving default parameters from local or cloud memory, as described below. Client device 110 may determine whether a given appliance 104 corresponds to a given user by retrieving profile information indicating an owner or registered user of the device either from the given appliance 104, local memory of client device 110, or cloud storage. Moreover, client device 110 may determine that a given appliance 104 corresponds to a present location of a given user by determining whether the given appliance 104 is presently moving or has recently moved (which is likely indicating that it is being carried by the given user).

Following embodiments where sensor 112 is a signal strength sensor, in response to determining that the signal strength exceeds the threshold signal strength for a given device (e.g., a given appliance 104), client device 110 determines that the given user corresponding to the given device is proximate to client device 110. However, where client device 110 determines that the signal strength does not exceed the threshold signal strength, client device 110 determines that the given user corresponding to the given device is not proximate to client device 110. As described above and below, client device 110 goes on to use this information about whether a given user is proximate to client device 110 to determine whether to transmit request 106 to the given user (e.g., similar to sensor 112 being a camera sensor and detecting additional user 116, sensor 112 as a signal strength sensor may detect additional user 116, and refrain from, or alter the manner in which, request 106 is transmitted to a device of particular user 114 (e.g., by transmitting request 106 in a manner that is not perceptible to additional user 116)).

After identifying, using sensor 112, that particular user 114 is proximate to client device 110, client device 110 may determine based on various settings programmed either by default for all users, or programmed specifically by or for particular user 114, whether to transmit request 106 to particular user 114. One possible setting is to always transmit request 106 to particular user 114 when particular user 114 is determined to be proximate to client device 110 using a device near particular user 114 (or using client device 110 itself) to engage in and output audio, video, or text corresponding to the communication session requested by request 106. Another possible setting is to never transmit request 106 to particular user 114 when particular user 114 is determined to be proximate to client device 110 using a device near particular user 114. Client device 110 may instead be set to always transmit request 106 to a specified device of particular user 114, or to always transmit to the specified device at times when particular user is determined to be proximate to client device 110. These settings to always, or never, transmit may depend on an identity of the source of request 106. For example, a user may always want to receive video calls from his family on an optimal device, like a smart television, when the user is determined to be within household 126. However, the user may prefer to never receive business video calls on a family device like his smart television, and may instead prefer to always have such calls declined when the user is within household 126, or to always have such calls transmitted to his smartphone device when the user is within household 126. Client device 110 may be programmed with such settings, or may automatically register such settings if, using a machine learning algorithm, client device 110 determines from behavior of particular user 114 that calls from particular sources are habitually treated in a particular fashion.

Following the above, another possible setting of client device 110 is being programmed to treat how a communication session requested by request 106 is to be output based on whether additional user 116 is detected, an identity of additional user 116, and/or a proximity of additional user 116 to client device 110 or of additional user 116 to particular user 114. For example, client device 110 may be set to transmit request 106 to particular user 114 when particular user 114 is determined to be proximate to client device 110 unless additional user 116 is detected, in which case client device 110 may be set to transmit request 106 in a manner that is not perceptible to additional user 116, or to entirely refrain from transmitting request 106. This setting may depend on the identity of the particular user 114; for example, as described above, if additional user 116 is registered to client device 110 or is indicated as sufficiently close to particular user 114 on a social graph, client device 110 may transmit request 106 to particular user 114 despite additional user 116 also being proximate to client device 110. All embodiments where a determination of whether client device 110 transmits request 106 to particular user 114 when additional user 116 is present included in this disclosure may be modified to consider a dependency on an identity of additional user 116.

The settings for whether client device 110 is to transmit request 106 to particular user 114 when additional user 116 is present may depend on the distances between particular user 114 and additional user 116 from the client device 110, or from each other. As depicted in FIG. 1, distance 118 (also described as distance $D1_1$) describes a distance between client device 110 and particular user 114. Distance 120 (also described as distance $D1_2$) describes a distance between client device 110 and additional user 116. Distance 122 (also described as distance D2) describes a distance between particular user 114 and additional user 116. Client device 110 may include settings to always, never, or sometimes transmit request 116 based on distance 118, distance 120, and distance 122, in manners consistent with those described above. Client device 110 may determine distance 118, distance 120, and distance 122 using sensor 112, or by querying information from devices of particular user 114 and additional user 116, which may themselves employ sensors to determine these distances.

Client device 110 may determine to transmit request 106 to a device near particular user based on the above-described settings, notwithstanding the presence of additional user 116. In such embodiments, client device 110 may determine that additional user 116 is participating in the communication session (e.g., based on detecting voice, visual, or textual input from additional user 116, or additionally determining that such input is related to input from the source user and particular user 114 (e.g., by comparing contextual relationship of such inputs)). Where client device 110 determines that additional user 116 is participating in the communication session, client device 110 may determine that additional user 116 becomes unable to participate in the communication session because additional user 116 leaves the vicinity of the device being used by particular user 114 to engage in the communication session. Client device 110 may make this determination by determining that distance 122 or distance 120 exceed a threshold value.

In such embodiments, client device 110 determines whether to extend 124 the communication session to a device of additional user 116. When determining whether to extend 124 the communication session, client device 110 may detect, while additional user 116 is proximate to the device of particular user 114, input by the additional user that indicates an intent to remain part of the communication session. For example, client device 110 may compare inputs from additional user 116 to known inputs indicating such an intent (e.g., "I'll be right back) that are registered to client device 110 to determine an intent to remain part of the communication session. As an additional embodiment, client device 110 may further determine a length of time between the input by additional user 116 and a time at which the second user became no longer proximate to the secondary device. Client device 110 may then determine whether the length of time is below a threshold length of time, and may responsively determine to extend 124 the communication session to a device of the additional user 116. Performing the extend 124 operation is described in further detail below as a hand off operation with respect to FIG. 6.

Figure 2:
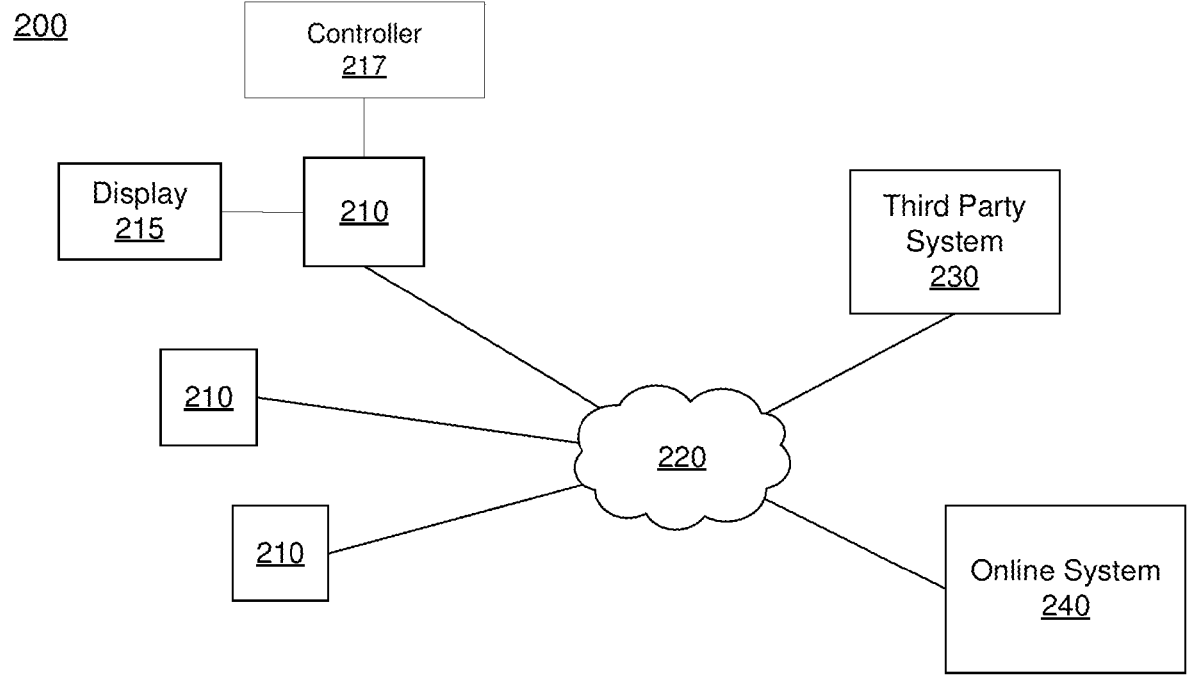
FIG. 2 is a block diagram of a system environment in which an online system operates, in accordance with an embodiment.

FIG. 2 is a block diagram of a system environment 200 for an online system 240. System environment 200 is operably coupled to system environment 100. The system environment 200 shown by FIG. 2 comprises one or more client devices 210 (which have similar functionality or may be equivalent to client device 102, client device 110 and appliance 104; all descriptions with respect to each such device apply equally to all such devices), a network 220 (which has similar functionality or may be equivalent to network 108), one or more third-party systems 230, and the online system 240. Additionally, in the system environment 200 shown by FIG. 2, a controller 217 is coupled to a client device 210. Controller 217 may be coupled to client device 110, client device 102, and/or appliance 104. Client device 102 and client device 110 may be thin-client systems, where controller 217 is coupled to a remote server or system (e.g., third party system 230 or online system 240) and controls client device 102 and/or client device 110 by way of network 220 or network 108. In alternative configurations, different and/or additional components may be included in the system environment 200. For example, the online system 240 is a social networking system, a content sharing network, or another system providing content to users.

The client devices 210 are one or more computing devices capable of receiving user input as well as transmitting and/or receiving data via the network 220. In one embodiment, a client device 210 is a conventional computer system, such as a desktop or a laptop computer. Alternatively, a client device 210 may be a device having computer functionality, such as a personal digital assistant (PDA), a mobile telephone, a smartphone, or another suitable device. A client device 210 is configured to communicate via the network 220. In one embodiment, a client device 210 executes an application allowing a user of the client device 210 to interact with the online system 240. For example, a client device 210 executes a browser application to enable interaction between the client device 210 and the online system 240 via the network 220. In another embodiment, a client device 210 interacts with the online system 240 through an application programming interface (API) running on a native operating system of the client device 210, such as IOS® or ANDROID™. As further described below in conjunction with FIG. 3, a client device 210 includes a display device 215 configured to present content, and one or more image capture devices configured to capture image or video data of a local area surrounding the client device 210.

The client devices 210 are configured to communicate via the network 220, which may comprise any combination of local area and/or wide area networks, using both wired and/or wireless communication systems. In one embodiment, the network 220 uses standard communications technologies and/or protocols. For example, the network 220 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 220 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 220 may be represented using any suitable format, such as hypertext markup language (HTML) or extensible markup language (XML). In some embodiments, all or some of the communication links of the network 220 may be encrypted using any suitable technique or techniques.

One or more third party systems 230 may be coupled to the network 220 for communicating with the online system 240, which is further described below in conjunction with FIG. 4. In one embodiment, a third party system 230 is an application provider communicating information describing applications for execution by a client device 210 or communicating data to client devices 210 for use by an application executing on the client device. In other embodiments, a third party system 230 provides content or other information for presentation via a client device 210. Third party system 230 may provide information (e.g., above-described register information, setting information, and the like) to client device 102 and client device 110. A third party system 230 may also communicate information to the online system 240, such as advertisements, content, or information about an application provided by the third party system 230.

Users may authorize the capture of data, identification of users, and/or sharing and cross-application use of user-related data in one or more ways. For example, user may pre-select various privacy settings before the users use the features of the client devices 210 and/or take actions in the online system 240. In another case, a selection dialogue may be prompted when users first carry out an action or use a feature of the client devices 210 and/or the online system 240 and/or when users have not carried out the action or used the feature for a predetermined period of time. In yet another example, the client devices 210 and the online system 240 may also provide notifications to the users when certain features that require user data begin to operate or are disabled due to users' selections to allow users to make further selections through the notifications. Other suitable ways for users to make authorizations are also possible.

Figure 3:
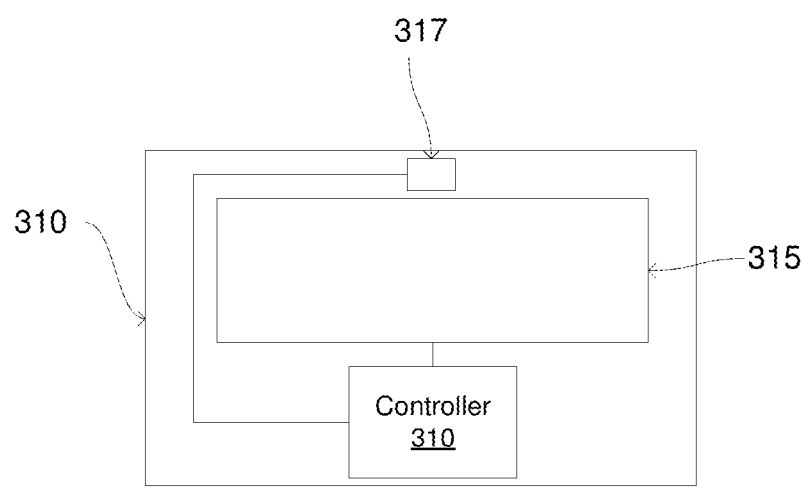
FIG. 3 is a block diagram of a client device, in accordance with an embodiment.

FIG. 3 is a block diagram of an embodiment of a client device 310, which has similar or identical functionality to client device 210). In the embodiment shown in FIG. 3, the client device 310 includes a display device 315 and an image capture device 317 (which may be equivalent to or identical to sensor 112), as well as a controller 310 (which may have similar or identical functionality to controller 217, or the described processor of a client device)). However, in other embodiments, the client device 310 includes different or additional components than those shown in FIG. 3.

The display device 315 may be integrated into the client device 310 or coupled to the client device 310. For example, a display device 315 integrated into a client device 310 is a display screen included in the client device 310. Alternatively, the display device 315 is a monitor or other display coupled to the client device 310. The display device 315 presents image data or video data to a user. Image or video data presented by the display device 315 is determined by an application executing on the client device 310. Different applications may be included on the client device 310, so execution of different applications changes the content presented by the user by the display device 315.

The image capture device 317 captures video data or images of a local area surrounding the client device 310 and within a field of view of the image capture device 317. In some embodiments, the image capture device 317 includes one or more cameras, one or more video cameras, or any other device capable of capturing image data or video data. Additionally, the image capture device 317 may include one or more filters (e.g., used to increase signal to noise ratio). Various parameters (e.g., focal length, focus, frame rate, ISO, sensor temperature, shutter speed, aperture, focal point etc.) configure capture of video data or image data by the image capture device 317. Hence, modifying one or more parameters of the image capture device 317 modifies video data or image data captured by the image capture device 217 after modification of the one or more parameters. While FIG. 3 shows a single image capture device 317 included in the client device 310, in other embodiments, the client device 310 includes any suitable number of image capture devices 317.

The controller 310 is coupled to the image capture device 317 and comprises a storage device coupled to a processor. In various embodiments, the controller 310 is also coupled to the display device 315. The controller 310 includes instructions that, when executed by the processor, apply one or more models to video data captured by the image capture device 317. As further described above and below (e.g., with respect to FIG. 1), the controller 310 may include information identifying various other client devices 210 (e.g., an appliance 104 corresponding to additional user 116, or client device 102 or client device 110) that are authorized to transfer an exchange of video data, or other data, with the client device 310. If the client device 310 receives a request including information identifying another client device 310 (e.g., request 106 from client device 102 to client device 110), the client device 310 determines whether the other client device 310 is authorized to transfer an exchange of video data or other data with the client device 310. As further described above and below (e.g., with respect to FIG. 1), if the other client device 310 authorized to exchange a transfer of video data or other data with the client device 310, the client device 310 obtains information from the other client device 310 and establishes a connection with the online system 240 to exchange the video data or other data exchanged by the other client device 310.

Moving the reference point back to FIG. 2, in various embodiments, the client device 210 includes one or more audio capture devices, such as microphones, which may also be used as sensor 212. For example, the client device 210 includes an array of microphones configured for beamforming in two or three dimensions. The audio capture devices capture audio signals from different regions within a local area surrounding the client device 210. In various embodiments, the one or more audio capture devices are coupled to the controller 310, which maintains information identifying different regions of the local area surrounding the client device 210; for example, the controller 310 identifies 24 fifteen degree regions of the local area surrounding the client device 210 originating from a point within the client device 210, identifying regions of a 360 degree local area surrounding the client device 210.

The one or more audio capture devices are coupled to the controller 310, which applies one or more models, such as machine learned models or other sound recognition models, to audio data captured from a region of the local area surrounding the client device 210. The controller 310 includes information identifying users or objects (e.g., a television, a mobile device), and application of the one or more models to audio captured from a region of the local area surrounding the client device 210 determines whether the captured audio data includes audio data from a user or an object identified by the controller 310 or ambient noise. In some embodiments, the one or more models applied by the controller 310 determine a particular user or a particular object identified by the controller 310 from which the one or more audio capture devices captured audio in the region. In other embodiments, the client device 210 communicates audio data captured by one or more audio devices to the online system 240, which applies the one or more models to determine whether the audio data includes audio data captured from an identified object or user or to determine a particular identified user or object from which audio data was captured. This may also be used to determine whether additional user 116 is participating in a communication session, as described above. The online system 240 provides the client device 210 with an indication of whether the captured audio data includes audio data captured from an identified object or user or provides information specifying a particular identified object or user from which the audio data was captured. The controller 310 or the online system 240 similarly determines whether audio captured from other regions surrounding the local area of the client device 210. Based on determinations of identified objects or users from which audio data in different regions was captured, the controller 310 modifies positioning of one or more audio devices to improve quality of audio captured from one or more regions. For example, the controller 310 repositions one or more audio capture devices to improve quality of audio captured from a region surrounding the local area from which audio data was captured from a specific user or from a specified object. Similarly, the controller 310 may reposition or otherwise modify one or more parameters of the image capture device 317 based on regions of the local area surrounding the client device 210 from which audio data was captured from different users or objects. The one or more audio devices and the image capture device 317 may be directed to different portions of the local area surrounding the client device 210 in various embodiments. For example, the image capture device 317 is directed to an object described by a user, while the controller 310 directs one or more audio capture devices to a region of the local area surrounding the client device 210 from which audio data was captured by a specific user.

Additionally, the controller 310 maintains and enforces one or more privacy settings for users or people identified from captured video data or other data in various embodiments. A privacy setting of a user or person determines how particular information associated with a user or person can be shared, and may be stored in association with information identifying the user or the person. In some embodiments, the controller 310 retrieves privacy settings for one or more users maintained by the online system 240. In one embodiment, a privacy setting specifies particular information associated with a user and identifies other entities with whom the specified information may be shared. Examples of entities with which information can be shared may include other users, applications, third party systems 230 or any entity that can potentially access the information. Examples of information that can be shared by a user include image data including the user or the person, audio data including audio captured from the user or the person, video data including the user or the person, and the like.

In various embodiments, the controller 310 does not identify a user within captured video data, audio data, image data, or other data unless the controller 310 obtains a privacy setting from the user authorizing the controller 310 to identify the user. For example, a privacy setting associated with a user has a default setting preventing the controller 310 from identifying the user, so the controller 310 does not identify the user unless the user manually alters the privacy setting to allow the controller 310 to identify the user. Additionally, an alternative privacy setting regulates transmission of information from the client device 210 identifying the user to another entity (e.g., another client device 210, the online system 240, a third party system 230) in various embodiments. The alternative privacy setting has a default setting preventing transmission of information identifying the user in various embodiments, preventing the controller 310 from transmitting information identifying the user to other entities unless the user manually modifies the alternative privacy setting to authorize transmission). The controller 310 maintains the one or more privacy settings for each user identified from captured video data or other data, allowing user-specific control of transmission and identification of each user. In some embodiments, the controller 310 prompts a person to provide privacy settings when the controller 310 initially identifies the person from captured data and stores the provided privacy settings in association with information identifying the person.

In some embodiments, the controller 310 obtains information maintained by the online system 240 or from one or more third party systems 230 for a user identified from captured video data, subject to privacy settings for the user. Based on video data, audio data, image data, or other data including the user previously captured by the client device 210 and the obtained information, the controller 310 may generate content for presentation to the user via the client device 210. For example, the controller 310 overlays content items from the online system 240 associated with one or more objects identified by the controller 310 from video data or image data captured by the client device 210. Alternatively, the online system 240 generates content for the user based on video data, image data, audio data, or other data including the user received from the client device 210 and information maintained by the online system 240 for the user (or obtained from one or more third party systems 230 by the online system 240) and provides the generated content to the client device 210 for presentation to the user.

Figure 4:
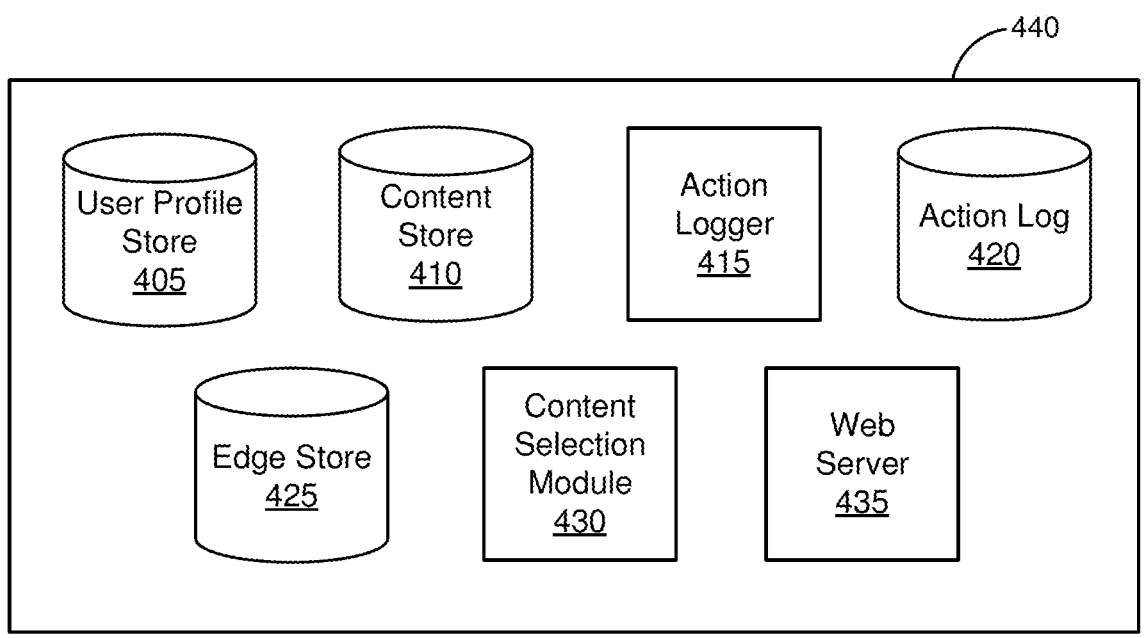
FIG. 4 is a block diagram of an online system, in accordance with an embodiment.

FIG. 4 is a block diagram of an architecture of the online system 240. The online system 240 shown in FIG. 4 includes a user profile store 405, a content store 410, an action logger 415, an action log 420, an edge store 425, a content selection module 430, and a web server 435. In other embodiments, the online system 240 may include additional, fewer, or different components for various applications. Conventional components such as network interfaces, security functions, load balancers, failover servers, management and network operations consoles, and the like are not shown so as to not obscure the details of the system architecture.

Each user of the online system 240 is associated with a user profile, which is stored in the user profile store 405. For example, particular user 114 and additional user 116 each have a user profile. Settings associated with particular user 114 and additional user 116, as described above with respect to FIG. 1, may be indicated on the user profile. The user profile may indicate whether a user is registered to a particular client device, such as client device 110. A user profile includes declarative information about the user that was explicitly shared by the user and may also include profile information inferred by the online system 240. In one embodiment, a user profile includes multiple data fields, each describing one or more attributes of the corresponding online system user. Examples of information stored in a user profile include biographic, demographic, and other types of descriptive information, such as work experience, educational history, gender, hobbies or preferences, location and the like. A user profile may also store other information provided by the user, for example, images or videos. In certain embodiments, images of users may be tagged with information identifying the online system users displayed in an image, with information identifying the images in which a user is tagged stored in the user profile of the user. A user profile in the user profile store 405 may also maintain references to actions by the corresponding user performed on content items in the content store 410 and stored in the action log 420.

Additionally, a user profile maintained for a user includes characteristics of one or more client devices 210 associated with the user, allowing the online system 240 to subsequently identify the user from characteristics provided by a client device 210. For example, an application associated with the online system 240 and executing on a client device 210 provides a device identifier or other information uniquely identifying the client device 210 to the online system 240 in association with a user identifier. The online system 210 stores the device identifier or other information uniquely identifying the client device 210 in the user profile maintained for the user, allowing subsequent identification of the user if the online system 240 receives the device identifier or other information uniquely identifying the client device 210. Other characteristics of client devices 210 associated with the user may be alternatively or additionally included in the user profile maintained by the user. For example, the user profile includes a network address used by a client device 210 to access a network 220, an identifier of an application executing on a client device 210 from which the online system 240 received information, a type of the client device 210 (e.g., a manufacturer, an identifier of a model of the client device 210, etc.) from which the online system 240 received information, and an operating system executing on the client device 210 from which the online system 240 received information. However, the online system 240 may store any suitable characteristics of a client device 210 in a user profile, allowing the online system 240 to maintain information about client devices 210 used by the user corresponding to the user profile.

In some embodiments, a user profile associated with a user includes information identifying one or more other users authorized to exchange information with a client device 210 associated with the user. For example, a user profile includes usernames, user identifiers, or other information uniquely identifying other users authorized to exchange video data with a client device associated with the user, allowing the user profile to individually identify other users who are authorized to exchange video data with the client device associated with the user (which may factor into the always, sometimes, and never ring embodiments described above with respect to FIG. 1). Additional information may be associated with information identifying a user authorized to exchange video data with the client device 210 associated with the user in various embodiments. For example, a time interval is associated with information identifying an additional user authorized to exchange video data with the client device 210 associated with the user to limit the additional user's authorization to exchange video data with the client device 210 associated with the user to the time interval. As another example, a connection with the user associated with the client device 210 via the online system 240 is associated with information identifying an additional user authorized to exchange video data with the receiving client device 210 to indicate the additional user is authorized to exchange video data with the client device 210 associated with the user while the user is connected to the additional user via the online system 240. In another example, an action is associated with information identifying an additional user authorized to exchange video data with the client device 210 associated with the user to indicate that the additional user is authorized to exchange video data with the client device 210 associated with the user if the online system 240 maintains information indicating the additional user has performed the action. However, any suitable criteria may be associated with information identifying an additional user authorized to exchange video data with a client device 210 associated with the user, limiting the additional user's authorization to exchange video data with the client device associated with the user unless characteristics associated with the additional user satisfy at least a threshold amount of the criteria.

Alternatively or additionally, information identifying one or more additional users of the online system 240 who are authorized to exchange video data with the client device 210 associated with the user comprises one or more rules, with each rule specifying one or more criteria. When at least a threshold amount of criteria specified by a rule are satisfied by characteristics of an additional user of the online system 240 maintained by the online system 240, the additional user is authorized to exchange video data with the client device 210 associated with the user. This allows additional users of the online system 240 having particular characteristics to be authorized to exchange video data with the client device 210 associated with the user. Example criteria specified by a rule include: a connection to the user maintained by the online system 240, a connection to an object maintained by the online system 240, an action stored by the online system 240 in association with the additional user authorized to exchange video data with the client device 210 associated with the user, and a connection to a specific user of the online system 240. However, any suitable criteria may be specified by one or more rules to identify additional users who are authorized to exchange video data with the client device 210 associated with the user.

Additionally, a user profile may include information identifying one or more client devices 210 authorized to transfer an exchange of video data or other content with another user to a receiving client device 210 associated with the user, as further described below in conjunction with FIG. 5. For example, the user profile of a user includes a device identifier (or other identifying information) of a receiving client device 210 and information identifying one or more other client devices 210 (e.g., device identifiers of other client devices) that are authorized to transfer an exchange of video data, or other content, from the other client devices 210 to the receiving client device 210. Additionally, the user profile may include one or more privacy settings associated with an identified other client device 210 specifying criteria to be satisfied for the identified other client device 210 to transfer an exchange of video data from the identified other client device 210 to the receiving client device 210. For example, the user profile includes information indicating that a client device 210 is authorized to transfer an exchange of video data form the client device 210 to the receiving client device 210 when a user who is authorized to exchange video data via the receiving client device 210 is identified in video data captured by the receiving client device 210.

While user profiles in the user profile store 405 are frequently associated with individuals, allowing individuals to interact with each other via the online system 240, user profiles may also be stored for entities such as businesses or organizations. This allows an entity to establish a presence on the online system 240 for connecting and exchanging content with other online system users. The entity may post information about itself, about its products or provide other information to users of the online system 240 using a brand page associated with the entity's user profile. Other users of the online system 240 may connect to the brand page to receive information posted to the brand page or to receive information from the brand page. A user profile associated with the brand page may include information about the entity itself, providing users with background or informational data about the entity.

The content store 410 stores objects that each represent various types of content. Examples of content represented by an object include a page post, a status update, a photograph, a video, a link, a shared content item, a gaming application achievement, a check-in event at a local business, a brand page, or any other type of content. Online system users may create objects stored by the content store 410, such as status updates, photos tagged by users to be associated with other objects in the online system 240, events, groups or applications. In some embodiments, objects are received from third-party applications or third-party applications separate from the online system 240. In one embodiment, objects in the content store 410 represent single pieces of content, or content "items." Hence, online system users are encouraged to communicate with each other by posting text and content items of various types of media to the online system 240 through various communication channels. This increases the amount of interaction of users with each other and increases the frequency with which users interact within the online system 240.

One or more content items included in the content store 410 include a creative, which is content for presentation to a user, and a bid amount. The creative is text, image, audio, video, or any other suitable data presented to a user. In various embodiments, the creative also specifies a page of content. For example, a content item includes a link that specifying a network address of a landing page of content to which a user is directed when the content item is accessed. If a user presented with the content The bid amount is included in a content item by a user and is used to determine an expected value, such as monetary compensation, provided by an advertiser to the online system 240 if content in the content item is presented to a user, if the content in the content item receives a user interaction when presented, or if any suitable condition is satisfied when content in the content item is presented to a user. For example, the bid amount included in a content item specifies a monetary amount that the online system 240 receives from a user who provided the content item to the online system 240 if content in the content item is displayed. In some embodiments, the expected value to the online system 240 of presenting the content from the content item may be determined by multiplying the bid amount by a probability of the content of the content item being accessed by a user.

Various content items may include an objective identifying an interaction that a user associated with a content item desires other users to perform when presented with content included in the content item. Example objectives include: installing an application associated with a content item, indicating a preference for a content item, sharing a content item with other users, interacting with an object associated with a content item, or performing any other suitable interaction. As content from a content item is presented to online system users, the online system 240 logs interactions between users presented with the content item or with objects associated with the content item. Additionally, the online system 240 receives compensation from a user associated with content item as online system users perform interactions with a content item that satisfy the objective included in the content item.

Additionally, a content item may include one or more targeting criteria specified by the user who provided the content item to the online system 240. Targeting criteria included in a content item request specify one or more characteristics of users eligible to be presented with the content item. For example, targeting criteria are used to identify users having user profile information, edges, or actions satisfying at least one of the targeting criteria. Hence, targeting criteria allow a user to identify users having specific characteristics, simplifying subsequent distribution of content to different users.

In one embodiment, targeting criteria may specify actions or types of connections between a user and another user or object of the online system 240. Targeting criteria may also specify interactions between a user and objects performed external to the online system 240, such as on a third party system 230. For example, targeting criteria identifies users that have taken a particular action, such as sent a message to another user, used an application, joined a group, left a group, joined an event, generated an event description, purchased or reviewed a product or service using an online marketplace, requested information from a third party system 230, installed an application, or performed any other suitable action. Including actions in targeting criteria allows users to further refine users eligible to be presented with content items. As another example, targeting criteria identifies users having a connection to another user or object or having a particular type of connection to another user or object.

The action logger 415 receives communications about user actions internal to and/or external to the online system 240, populating the action log 420 with information about user actions. Examples of actions include adding a connection to another user, sending a message to another user, uploading an image, reading a message from another user, viewing content associated with another user, and attending an event posted by another user. In addition, a number of actions may involve an object and one or more particular users, so these actions are associated with the particular users as well and stored in the action log 420.

The action log 420 may be used by the online system 240 to track user actions on the online system 240, as well as actions on third party systems 230 that communicate information to the online system 240. Users may interact with various objects on the online system 240, and information describing these interactions is stored in the action log 420. Examples of interactions with objects include: commenting on posts, sharing links, checking-in to physical locations via a client device 210, accessing content items, and any other suitable interactions. Additional examples of interactions with objects on the online system 240 that are included in the action log 420 include: commenting on a photo album, communicating with a user, establishing a connection with an object, joining an event, joining a group, creating an event, authorizing an application, using an application, expressing a preference for an object ("liking" the object), and engaging in a transaction. Additionally, the action log 420 may record a user's interactions with advertisements on the online system 240 as well as with other applications operating on the online system 240. In some embodiments, data from the action log 420 is used to infer interests or preferences of a user, augmenting the interests included in the user's user profile and allowing a more complete understanding of user preferences.

The action log 420 may also store user actions taken on a third party system 230, such as an external website, and communicated to the online system 240. For example, an e-commerce website may recognize a user of an online system 240 through a social plug-in enabling the e-commerce website to identify the user of the online system 240. Because users of the online system 240 are uniquely identifiable, e-commerce websites, such as in the preceding example, may communicate information about a user's actions outside of the online system 240 to the online system 240 for association with the user. Hence, the action log 420 may record information about actions users perform on a third party system 230, including webpage viewing histories, advertisements that were engaged, purchases made, and other patterns from shopping and buying. Additionally, actions a user performs via an application associated with a third party system 230 and executing on a client device 210 may be communicated to the action logger 415 by the application for recordation and association with the user in the action log 420. Action log 420 may be used to infer whether settings should be set or updated for how to manage an incoming request 106, as described above with respect to FIG. 1.

In one embodiment, the edge store 425 stores information describing connections between users and other objects on the online system 240 as edges. Some edges may be defined by users, allowing users to specify their relationships with other users. For example, users may generate edges with other users that parallel the users' real-life relationships, such as friends, co-workers, partners, and so forth. Other edges are generated when users interact with objects in the online system 240, such as expressing interest in a page on the online system 240, sharing a link with other users of the online system 240, and commenting on posts made by other users of the online system 240.

An edge may include various features each representing characteristics of interactions between users, interactions between users and objects, or interactions between objects. For example, features included in an edge describe a rate of interaction between two users, how recently two users have interacted with each other, a rate or an amount of information retrieved by one user about an object, or numbers and types of comments posted by a user about an object. The features may also represent information describing a particular object or user. For example, a feature may represent the level of interest that a user has in a particular topic, the rate at which the user logs into the online system 240, or information describing demographic information about the user. Each feature may be associated with a source object or user, a target object or user, and a feature value. A feature may be specified as an expression based on values describing the source object or user, the target object or user, or interactions between the source object or user and target object or user; hence, an edge may be represented as one or more feature expressions.

The edge store 425 also stores information about edges, such as affinity scores for objects, interests, and other users. Affinity scores, or "affinities," may be computed by the online system 240 over time to approximate a user's interest in an object or in another user in the online system 240 based on the actions performed by the user. A user's affinity may be computed by the online system 240 over time to approximate the user's interest in an object, in a topic, or in another user in the online system 240 based on actions performed by the user. Computation of affinity is further described in U.S. patent application Ser. No. 12/978,265, filed on Dec. 23, 2010, U.S. patent application Ser. No. 13/690,254, filed on Nov. 30, 2012, U.S. patent application Ser. No. 13/689,969, filed on Nov. 30, 2012, and U.S. patent application Ser. No. 13/690,088, filed on Nov. 30, 2012, each of which is hereby incorporated by reference in its entirety. Multiple interactions between a user and a specific object may be stored as a single edge in the edge store 425, in one embodiment. Alternatively, each interaction between a user and a specific object is stored as a separate edge. In some embodiments, connections between users may be stored in the user profile store 405, or the user profile store 405 may access the edge store 425 to determine connections between users. Such connections may be used to determine whether to forward a call to particular user 114 when additional user 116 is present, as described above with respect to FIG. 1.

The content selection module 430 selects one or more content items for communication to a client device 210 to be presented to a user (e.g., based on authorization settings of the user, as discussed above and below). Content items eligible for presentation to the user are retrieved from the content store 410 or from another source by the content selection module 430, which selects one or more of the content items for presentation to the viewing user. A content item eligible for presentation to the user is a content item associated with at least a threshold number of targeting criteria satisfied by characteristics of the user or is a content item that is not associated with targeting criteria. In various embodiments, the content selection module 430 includes content items eligible for presentation to the user in one or more selection processes, which identify a set of content items for presentation to the user. For example, the content selection module 430 determines measures of relevance of various content items to the user based on attributes associated with the user by the online system 240 and based on the user's affinity for different content items. A measure of relevance of a content item to the user is based on a measure of quality of the content item for the user, which may be based on the creative included in the content item as well as content of a landing page identified by a link in the content item. Based on the measures of relevance, the content selection module 430 selects content items for presentation to the user. As an additional example, the content selection module 430 selects content items having the highest measures of relevance or having at least a threshold measure of relevance for presentation to the user. Alternatively, the content selection module 430 ranks content items based on their associated measures of relevance and selects content items having the highest positions in the ranking or having at least a threshold position in the ranking for presentation to the user.

Content items eligible for presentation to the user may include content items associated with bid amounts. The content selection module 430 uses the bid amounts associated with content items when selecting content for presentation to the user. In various embodiments, the content selection module 430 determines an expected value associated with various content items based on their bid amounts and selects content items associated with a maximum expected value or associated with at least a threshold expected value for presentation. An expected value associated with a content item represents an expected amount of compensation to the online system 240 for presenting the content item. For example, the expected value associated with a content item is a product of the content item's bid amount and a likelihood of the user interacting with the content item. The content selection module 430 may rank content items based on their associated bid amounts and select content items having at least a threshold position in the ranking for presentation to the user. In some embodiments, the content selection module 430 ranks both content items not associated with bid amounts and content items associated with bid amounts in a unified ranking based on bid amounts and measures of relevance associated with content items. Based on the unified ranking, the content selection module 430 selects content for presentation to the user. Selecting content items associated with bid amounts and content items not associated with bid amounts through a unified ranking is further described in U.S. patent application Ser. No. 13/545,266, filed on Jul. 10, 2012, which is hereby incorporated by reference in its entirety.

For example, the content selection module 430 receives a request to present a feed of content to a user of the online system 240. The feed includes content items such as stories describing actions associated with other online system users connected to the user. The content selection module 430 accesses one or more of the user profile store 405, the content store 410, the action log 420, and the edge store 425 to retrieve information about the user. For example, information describing actions associated with other users connected to the user or other data associated with users connected to the user are retrieved. Content items from the content store 410 are retrieved and analyzed by the content selection module 430 to identify candidate content items eligible for presentation to the user. For example, content items associated with users who not connected to the user or stories associated with users for whom the user has less than a threshold affinity are discarded as candidate content items. Based on various criteria, the content selection module 430 selects one or more of the content items identified as candidate content items for presentation to the identified user. The selected content items are included in a feed of content that is presented to the user. For example, the feed of content includes at least a threshold number of content items describing actions associated with users connected to the user via the online system 240.

In various embodiments, the content selection module 430 presents content to a user through a feed including a plurality of content items selected for presentation to the user. The content selection module 430 may also determine the order in which selected content items are presented via the feed. For example, the content selection module 430 orders content items in the feed based on likelihoods of the user interacting with various content items.

The content selection module 430 receives video data captured by an image capture device 217 included in a client device 210 associated with a sending user of the online system and transmits the video data to a receiving client device 210 for presentation to a receiving user via a display device 215. The content selection module may receive a request from the client device 210 that identifies the receiving user, and subsequently transmits a request to the receiving client device 210 to establish a connection with the online system 240 for receiving data from the sending client device 210.

The content selection module 430 enforces one or more privacy settings of the users of the online system 240 in various embodiments. A privacy setting of a user determines how particular information associated with a user can be shared, and may be stored in the user profile of a user in the user profile store 405. In one embodiment, a privacy setting specifies particular information associated with a user and identifies other entities with whom the specified information may be shared. Examples of entities with which information can be shared may include other users, applications, third party systems 230 or any entity that can potentially access the information. Examples of information that can be shared by a user include user profile information like profile photo, phone numbers associated with the user, user's connections, video data including the user, actions taken by the user such as adding a connection, changing user profile information and the like. In various embodiments, the online system 240 maintains privacy settings associated with a user having a default setting preventing other entities from accessing or receiving content associated with the user, and allows the user to modify different privacy settings to allow other entities that are specified by the user to access or to retrieve content corresponding to the modified privacy settings.

The privacy setting specification may be provided at different levels of granularity. In one embodiment, a privacy setting may identify specific information to be shared with other users. For example, the privacy setting identifies a work phone number or a specific set of related information, such as, personal information including profile photo, home phone number, and status. Alternatively, the privacy setting may apply to all the information associated with the user. Specification of the set of entities that can access particular information may also be specified at various levels of granularity. Various sets of entities with which information can be shared may include, for example, all users connected to the user, a set of users connected to the user, additional users connected to users connected to the user all applications, all third party systems 230, specific third party systems 230, or all external systems.

One embodiment uses an enumeration of entities to specify the entities allowed to access identified information or to identify types of information presented to different entities. For example, the user may specify types of actions that are communicated to other users or communicated to a specified group of users. Alternatively, the user may specify types of actions or other information that is not published or presented to other users.

The content selection module 430 includes logic to determine if certain information associated with a user can be accessed by other users connected to the user via the online system 240, third-party system 230 and/or other applications and entities. Based on the user's privacy settings, the content selection module 430 determines if another user, a third-party system 230, an application or another entity is allowed to access information associated with the user, including information about actions taken by the user. For example, the content section module 230 uses a user's privacy setting to determine if video data including the user may be presented to another user. This enables a user's privacy setting to specify which other users, or other entities, are allowed to receive data about the user's actions or other data associated with the user.

The web server 435 links the online system 240 via the network 220 to the one or more client devices 210, as well as to the one or more third party systems 230. The web server 435 serves web pages, as well as other content, such as JAVA®, FLASH®, XML and so forth. The web server 435 may receive and route messages between the online system 240 and the client device 210, for example, instant messages, queued messages (e.g., email), text messages, short message service (SMS) messages, or messages sent using any other suitable messaging technique. A user may send a request to the web server 435 to upload information (e.g., images or videos) that are stored in the content store 410. Additionally, the web server 435 may provide application programming interface (API) functionality to send data directly to native client device operating systems, such as IOS®, ANDROID™, or BlackberryOS.

FIG. 5 is a flowchart of a method for determining whether to transmit a request for a communication session from a client device to a particular user, in accordance with an embodiment. In various embodiments, the steps described in conjunction with FIG. 5 may be performed in different orders. Additionally, in some embodiments, the method may include different and/or additional steps than those shown in FIG. 5. Process 500 begins by a processor of a client device receiving 505 a request to initiate a communication session with a particular user of a first plurality of users that are registered with the client device. For example, controller 310 of client device 110 receives request 106 from appliance 104 over network 120 to initiate a communication session with particular user 114. Particular user 114 is registered with client device 110, as indicated by information on user profile store 405 and/or edge store 425.

The processor of the client device then determines 510, using a sensor of the client device, a respective identity of each of a second plurality of users that are proximate to the client device. For example, subject to authorization by the user, the processor of client device 110 uses a camera sensor or a signal strength sensor implemented by sensor 112 to determine a respective identity of each of particular user 114 and additional user 116 (e.g., using facial recognition).

The processor of the client device then determines 515 whether an identity of the particular user matches the respective identity of any of the second plurality of users. For example, the processor of client device 110 determines whether anyone identified, such as particular user 114 and additional user 116, is registered to the client device, as indicated by user profile store 405. Process 500 ends if the identity of the particular user does not match, but continues if the identity of the particular user does match, where the processor transmits 520 the request to a device of the particular user.

Figure 6:
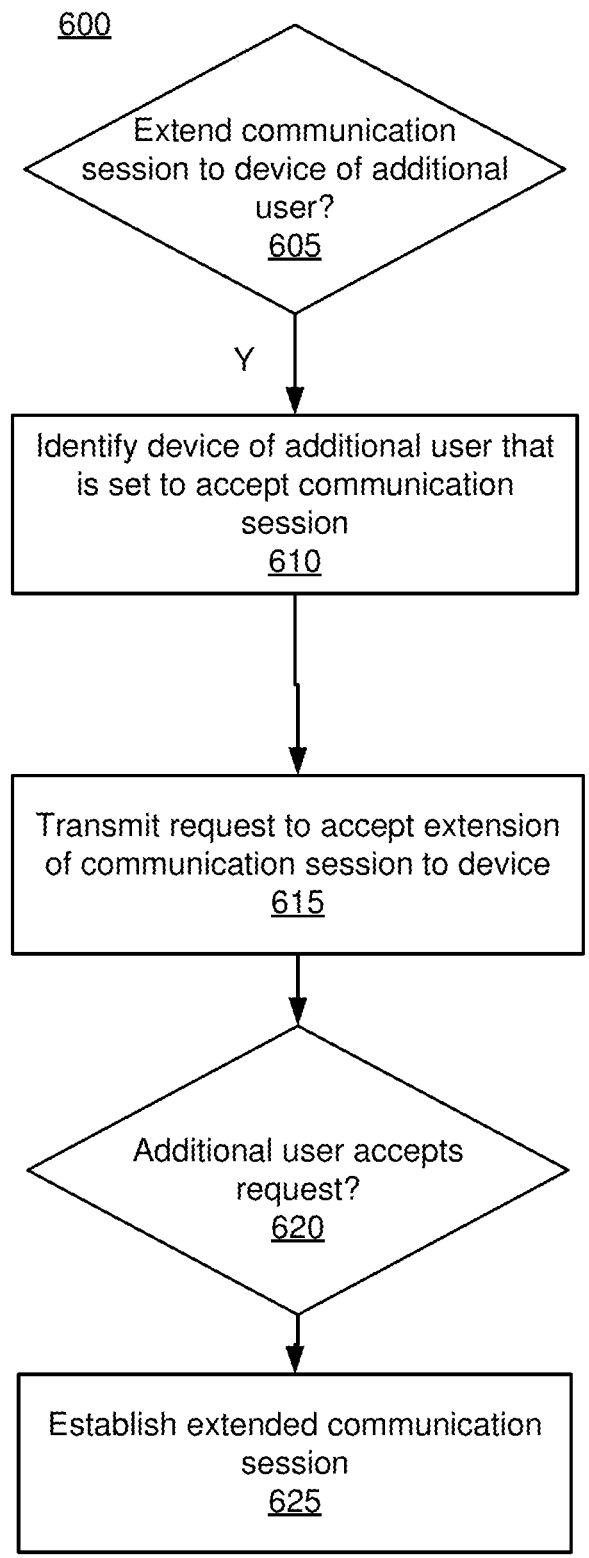
FIG. 6 is a flowchart of one embodiment of a method for extending a communication session to a device of an additional user, in accordance with one embodiment.

FIG. 6 is a flowchart of one embodiment of a method for extending a communication session to a device of an additional user, in accordance with one embodiment. In various embodiments, the steps described in conjunction with FIG. 6 may be performed in different orders. Additionally, in some embodiments, the method may include different and/or additional steps than those shown in FIG. 6.

Process 600 begins with a processor of a client device (e.g., client device 110) determining 605 whether to extend a communication session to a device of an additional user (e.g., additional user 116). Such a determination is described at length with respect to FIG. 1, in particular with respect to the extend 124 operation. Such an operation is also described in detail in commonly-owned U.S. patent application Ser. No. 15/855,284, filed Dec. 27, 2017, currently pending, the disclosure of which is hereby incorporated by reference herein in its entirety. The processor of the client device goes on to identify 610 a device of the additional user (e.g., additional user 116) that is set to accept the communication session. For example, client device 110 obtains information identifying one or more appliances 104 corresponding to additional user 116 with which client device 110 is authorized to transfer video data. For example, client device 110 receives device identifiers associated with one or more appliances 104 authorized to exchange video data, or other content, with the receiving client device. A device identifier of an appliance 104 uniquely identifies the appliance 104, and may be an alphanumeric string associated with the client device appliance 104. In various embodiments, additional user 116 provides information identifying one or more other appliances 104 authorized to exchange video data with the client device 110, which locally stores the information identifying the one or more other appliances 104 (e.g., in the above-described register). Alternatively, the client device 110 communicates with the online system 240 and transmits the information identifying the one or more appliances 104 to the online system 240, which stores the information identifying the one or more appliances 104 in association with the client device 110.

In other embodiments, the client device 110 obtains information identifying additional user 116 using the online system 240 who is authorized to exchange video data with client device 110 and obtains information associated with the identified user that includes information identifying one or more appliances 104 associated with the identified user. Information identifying appliances 104 associated with the identified user specifies one or more appliances 104 authorized to exchange video data with client device 110.

Subsequently, the client device 110 transmits 615 a request to the device of the additional user to transfer an exchange of video data from the communication session to the device of the additional user. If the additional user accepts 620 the request, the communication session is extended 625 to include the additional user by way of the device of the additional user. Client device 110 may determine that the additional user (e.g., additional user 116) has accepted the request by determining receipt of a specific input (e.g., an audio command, a gesture, a selection of a particular element, a particular movement relative to a reference position, etc., any of which may be captured by the client device 110 or additional user 116's appliance 104). Client device 110 may add further devices corresponding to the same or additional users to the communication session by replicating the means for adding the first additional user as described above for additional devices or users.

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

In particular embodiments, one or more objects (e.g., content or other types of objects) of a computing system may be associated with one or more privacy settings. The one or more objects may be stored on or otherwise associated with any suitable computing system or application, such as, for example, a social-networking system 160, a client system 130, a third-party system 170, a social-networking application, a messaging application, a photo-sharing application, or any other suitable computing system or application. Although the examples discussed herein are in the context of an online social network, these privacy settings may be applied to any other suitable computing system. Privacy settings (or "access settings") for an object may be stored in any suitable manner, such as, for example, in association with the object, in an index on an authorization server, in another suitable manner, or any suitable combination thereof. A privacy setting for an object may specify how the object (or particular information associated with the object) can be accessed, stored, or otherwise used (e.g., viewed, shared, modified, copied, executed, surfaced, or identified) within the online social network. When privacy settings for an object allow a particular user or other entity to access that object, the object may be described as being "visible" with respect to that user or other entity. As an example and not by way of limitation, a user of the online social network may specify privacy settings for a user-profile page that identify a set of users that may access work-experience information on the user-profile page, thus excluding other users from accessing that information.

In particular embodiments, privacy settings may allow a first user to specify (e.g., by opting out, by not opting in) whether the social-networking system 160 may receive, collect, log, or store particular objects or information associated with the user for any purpose. In particular embodiments, privacy settings may allow the first user to specify whether particular applications or processes may access, store, or use particular objects or information associated with the user. The privacy settings may allow the first user to opt in or opt out of having objects or information accessed, stored, or used by specific applications or processes. The social-networking system 160 may access such information in order to provide a particular function or service to the first user, without the social-networking system 160 having access to that information for any other purposes. Before accessing, storing, or using such objects or information, the social-networking system 160 may prompt the user to provide privacy settings specifying which applications or processes, if any, may access, store, or use the object or information prior to allowing any such action. As an example and not by way of limitation, a user may specify privacy settings that images captured to identify the user should not be stored by the social-networking system 160.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A method comprising:
   receiving, at a client device, a request to initiate a communication session with a particular user that is registered with the client device;
   determining, using a sensor of the client device, that the particular user is proximate to the client device;
   determining whether an additional user is proximate to the client device;
   in response to determining that the additional user is proximate to the client device, determining a setting of the particular user that is associated with the additional user;
   selecting a device of the particular user based on the setting; and
   transmitting the request to the selected device.

2. The method of claim 1, wherein the method further comprises, in response to receiving the request:
   retrieving a profile of the particular user from a database;
   determining whether the profile indicates that the request should always or never be alerted to the particular user;
   in response to determining that the profile indicates that the request should always be alerted to the particular user, transmitting the request to the device of the particular user regardless of whether the additional user is proximate to the client device; and
   in response to determining that the profile indicates that the request should never be alerted to the particular user, refraining from transmitting the request to the device of the particular user regardless of whether the additional user is proximate to the client device.

3. The method of claim 1, wherein the sensor is a camera sensor of the client device, and wherein determining a setting associated with the additional user comprises:
   activating the camera sensor;
   detecting an image of a face using the camera sensor;
   in response to detecting the image, determining whether the face matches characteristics of the additional user; and
   in response to determining that the face matches the characteristics of the user, determining the identity of the additional user; and
   determining the setting based on the identity of the additional user.

4. The method of claim 3, wherein determining the setting based on the identity of the additional user comprises:
   accessing a social graph;
   determining whether the social graph comprises an edge connecting a first node representing the particular user and a second node representing the additional user; and
   determining the setting based on whether the social graph comprises the edge.

5. The method of claim 1, wherein the sensor is a signal strength sensor, wherein determining, using the sensor, whether the additional user is proximate to the client device comprises detecting, by the client device, a device corresponding to an additional user, and wherein transmitting the request to the selected device comprises:
   determining a signal strength of the device corresponding to the additional user; and
   determining whether the signal strength of the device corresponding to the additional user matches a signal strength of the device of the particular user,
   wherein transmitting the request to the selected device comprises:
   in response to determining that the signal strength of the device corresponding to the different user matches the signal strength of the device of the particular user, outputting the alert to the particular user in a manner that is not perceptible to the additional user.

6. The method of claim 1, further comprising:

detecting an acceptance of the communication session based on an interaction by the particular user with the request;

detecting, during the communication session, a presence of the additional user;

detecting that the additional user is no longer proximate to the device of the particular user;

determining whether to extend the communication session to a device of the additional user; and in response to determining to extend the communication session to the device corresponding to the additional user, causing a request to be transmitted to the device corresponding to the additional user to join the communication session.

7. The method of claim 6, wherein determining whether to extend the communication session to the device corresponding to the additional user comprises:

detecting, while the additional user is proximate to the device of the particular user, input by the additional user that indicates an intent to remain part of the communication session;

determining a length of time between the input by the additional user and a time at which the second user became no longer proximate to the secondary device;

determining that the length of time is below a threshold length of time; and in response to determining that the length of time is below the threshold length of time, determining to extend the communication session to the device of the additional user.

8. A computer program product comprising a non-transitory computer readable storage medium having instructions encoded thereon that, when executed by one or more processors of a client device, cause the one or more processors to:

receive, at a client device, a request to initiate a communication session with a particular user that is registered with the client device;

determine, using a sensor of the client device, that the particular user is proximate to the client device;

determine whether an additional user is proximate to the client device;

in response to determining that the additional user is proximate to the client device, determine a setting of the particular user that is associated with the additional user;

select a device of the particular user based on the setting; and transmit the request to the selected device.

9. The computer program product of claim 8, wherein the one or more processors are further caused to, in response to receiving the request:

retrieve a profile of the particular user from a database;

determine whether the profile indicates that the request should always or never be alerted to the particular user;

in response to determining that the profile indicates that the request should always be alerted to the particular user, transmit the request to the device of the particular user regardless of whether the additional user is proximate to the client device; and in response to determining that the profile indicates that the request should never be alerted to the particular user, refrain from transmitting the request to the device of the particular user regardless of whether the additional user is proximate to the client device.

10. The computer program product of claim 8, wherein the sensor is a camera sensor of the client device, and wherein determining a setting associated with the additional user comprises:

activating the camera sensor;

detecting an image of a face using the camera sensor;

in response to detecting the image, determining whether the face matches characteristics of the additional user; and in response to determining that the face matches the characteristics of the user, determining the identity of the additional user; and determining the setting based on the identity of the additional user.

11. The computer program product of claim 10, wherein determining the setting based on the identity of the additional user comprises:

accessing a social graph;

determining whether the social graph comprises an edge connecting a first node representing the particular user and a second node representing the additional user; and determining the setting based on whether the social graph comprises the edge.

12. The computer program product of claim 8, wherein the sensor is a signal strength sensor, wherein determining, using the sensor, whether the additional user is proximate to the client device comprises detecting, by the client device, a device corresponding to an additional user, and wherein transmitting the request to the selected device comprises:

determining a signal strength of the device corresponding to the additional user; and determining whether the signal strength of the device corresponding to the additional user matches a signal strength of the device of the particular user, wherein transmitting the request to the selected device comprises:

in response to determining that the signal strength of the device corresponding to the different user matches the signal strength of the device of the particular user, outputting the alert to the particular user in a manner that is not perceptible to the additional user.

13. The computer program product of claim 8, wherein the one or more processors are further caused to:

detect an acceptance of the communication session based on an interaction by the particular user with the request;

detect, during the communication session, a presence of the additional user;

detect that the additional user is no longer proximate to the device of the particular user;

determine whether to extend the communication session to a device of the additional user; and in response to determining to extend the communication session to the device corresponding to the additional user, cause a request to be transmitted to the device corresponding to the additional user to join the communication session.

14. The computer program product of claim 13, wherein determining whether to extend the communication session to the device corresponding to the additional user comprises:

detecting, while the additional user is proximate to the device of the particular user, input by the additional user that indicates an intent to remain part of the communication session;

determining a length of time between the input by the additional user and a time at which the second user became no longer proximate to the secondary device;

determining that the length of time is below a threshold length of time; and in response to determining that the length of time is below the threshold length of time, determining to extend the communication session to the device of the additional user.

15. A system comprising:

memory with instructions encoded thereon; and one or more processors that, when executing the instructions, are caused to perform operations comprising:

receiving, at a client device, a request to initiate a communication session with a particular user that is registered with the client device;

determining, using a sensor of the client device, that the particular user is proximate to the client device;

determining whether an additional user is proximate to the client device;

in response to determining that the additional user is proximate to the client device, determining a setting of the particular user that is associated with the additional user;

selecting a device of the particular user based on the setting; and transmitting the request to the selected device.

16. The system of claim 15, wherein the operations further comprise, in response to receiving the request:

retrieving a profile of the particular user from a database;

determining whether the profile indicates that the request should always or never be alerted to the particular user;

in response to determining that the profile indicates that the request should always be alerted to the particular user, transmitting the request to the device of the particular user regardless of whether the additional user is proximate to the client device; and in response to determining that the profile indicates that the request should never be alerted to the particular user, refraining from transmitting the request to the device of the particular user regardless of whether the additional user is proximate to the client device.

17. The system of claim 15, wherein the sensor is a camera sensor of the client device, and wherein determining a setting associated with the additional user comprises:

activating the camera sensor;

detecting an image of a face using the camera sensor;

in response to detecting the image, determining whether the face matches characteristics of the additional user; and in response to determining that the face matches the characteristics of the user, determining the identity of the additional user; and determining the setting based on the identity of the additional user.

18. The system of claim 17, wherein determining the setting based on the identity of the additional user comprises:

accessing a social graph;

determining whether the social graph comprises an edge connecting a first node representing the particular user and a second node representing the additional user; and determining the setting based on whether the social graph comprises the edge.

19. The system of claim 15, wherein the sensor is a signal strength sensor, wherein determining, using the sensor, whether the additional user is proximate to the client device comprises detecting, by the client device, a device corresponding to an additional user, and wherein transmitting the request to the selected device comprises:

determining a signal strength of the device corresponding to the additional user; and determining whether the signal strength of the device corresponding to the additional user matches a signal strength of the device of the particular user, wherein transmitting the request to the selected device comprises:

in response to determining that the signal strength of the device corresponding to the different user matches the signal strength of the device of the particular user, outputting the alert to the particular user in a manner that is not perceptible to the additional user.

20. The system of claim 15, wherein the operations further comprise:

detecting an acceptance of the communication session based on an interaction by the particular user with the request;

detecting, during the communication session, a presence of the additional user;

detecting that the additional user is no longer proximate to the device of the particular user;

determining whether to extend the communication session to a device of the additional user; and in response to determining to extend the communication session to the device corresponding to the additional user, causing a request to be transmitted to the device corresponding to the additional user to join the communication session.

\* \* \* \* \*